(12) United States Patent
Alvarez et al.

(10) Patent No.: US 8,032,485 B2
(45) Date of Patent: Oct. 4, 2011

(54) RAPID CACHING AND DATA DELIVERY SYSTEM AND METHOD

(75) Inventors: Eddie J Alvarez, West Windsor, NJ (US); Stephen K Dantu, New Hempstead, NY (US); Sastry VSM Durvasula, Phoenix, AZ (US); Marat S Khalfin, Staten Island, NY (US); Deep Thomas, East Brunswick, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 643 days.

(21) Appl. No.: 12/024,926

(22) Filed: Feb. 1, 2008

(65) Prior Publication Data

US 2009/0198892 A1 Aug. 6, 2009

(51) Int. Cl.
*G06F 17/30* (2006.01)
(52) U.S. Cl. ........................... 707/602; 707/795
(58) Field of Classification Search .................. 707/602, 707/795
See application file for complete search history.

(56) References Cited

U.S. PATENT DOCUMENTS

2003/0212654 A1* 11/2003 Harper et al. ............. 707/1
2005/0160076 A1* 7/2005 Kanemasa ............. 707/2

OTHER PUBLICATIONS

Oracle Database Cache Concepts and Administration Guide, Feb. 2001, pp. 1-9.*

* cited by examiner

*Primary Examiner* — John E Breene
*Assistant Examiner* — Albert Phillips, III
(74) *Attorney, Agent, or Firm* — Snell & Wilmer L.L.P.

(57) ABSTRACT

The initial systems analysis of a new data source fully defines each data element and also designs, tests and encodes complete data integration instructions for each data element. A metadata cache stores the data element definition and data element integration instructions. The metadata cache enables a comprehensive view of data elements in an enterprise data architecture. When data is requested that includes data elements defined in a metadata cache, the metadata cache and associated software modules automatically generate database elements to fully integrate the requested data elements into existing databases.

14 Claims, 5 Drawing Sheets

RAPID CACHING AND DATA DELIVERY SYSTEM AND METHOD

FIELD OF THE INVENTION

The present invention generally relates to integrating data from data sources to end users, and more particularly, to rapidly integrating new data elements within an enterprise data architecture using cached metadata and automated database management techniques.

BACKGROUND OF THE INVENTION

Organizations desire access to data in order to function efficiently. Advances in computer networks, data processing and data storage have greatly enhanced the ability to assemble large repositories of data and use this data for strategic planning, operational management and tactical decision making. Large organizations or enterprises such as, for example, corporations, government agencies and private institutions often obtain data from many sources including database systems of record such as internal systems, transaction databases, accounting records, sales records, customer databases and/or third-party data providers. Moreover, most organizations spend a significant portion of their operating budget on human and information technology resources to maintain data and provide information technology solutions that provide access to the data.

Due to the volume, complexity and importance of data typically relied upon by most every function of an enterprise, data management organizations (DMOs) play a critical role in the success of most modern enterprises. Typically, among a DMO's most challenging and resource intensive tasks is integrating data from various sources and different formats into a set of production data which may include centralized databases and other data sources. The production data should be technically valid, internally consistent, stable and reliable. More importantly, production data should be accessible in a form that is valid and useful to the enterprise and capable of interfacing with applications which may include a variety of software modules, business analysis tools and information systems. As the number of data sources maintained by a DMO grows, so does the expense and complexity of maintaining production data.

The typical marketing department is an example of an organization within an enterprise that relies heavily on real-time, high-quality production data. In order to plan and execute effective campaigns, marketing departments access data that may be generated internally or acquired from third-party sources. For example a typical marketing department may desire access to industry data, sales records, customer data, customer survey data, government regulations, competitor information, partner data, and the like. This information is often time sensitive, so an organization without real-time or near real-time access to data often fails to accomplish its goals. For example, a marketing department that is trying to take advantage of a favorable market condition may miss the opportunity to advertise effectively without relevant and accurate data on target customers.

A typical method of managing and integrating data from multiple sources is commonly known by the acronym ETL which stands for "extract," "transform" and "load." ETL is a set of methods used by DMOs to gather data from one or more data sources (extract), manipulate the data into a valid and useful format (transform) and put the data into production databases (load) where the data is accessed and manipulated by the organization's various information technology resources and applications. However, existing ETL systems and processes often fail to deliver timely, accurate and relevant data to meet an enterprise's needs. Therefore, a long-felt need exists for a system to reduce time and costs associated with integrating new data sources into an enterprise data architecture.

SUMMARY OF THE INVENTION

The present invention provides a rapid caching and data delivery system and method that reduces the time for data from new sources to be integrated into an enterprise's data management system. The system provides a metadata cache that stores comprehensive data element definition and data element integration instructions. When a data management organization performs the initial systems analysis for a new data source, data assessment processes fully define each data element and design, and encode and test complete data integration instructions for each data element. The processes drastically decrease the total process time to deliver new data elements to end users.

A management information system provides end users accessing the cached metadata a comprehensive view of data available to an enterprise. With such a comprehensive view, users plan operations with full knowledge of the information available to them. Even if the data for a data element of interest has not been loaded into any database accessible to the user, the user is able to request access to the data and automated processes use information in the metadata cache to generate the suitable database structures and load the requested data.

In one embodiment, the data management system receives a request for new data. The request is a request for a specific set of actual data ("raw data") and/or a request for a certain data elements that relate to raw data. The enterprise data management system receives data from a data source and the data is assessed for integration into the enterprise data architecture. In a representative embodiment, the data requested represents a subset of the data received from the data source. The data received from the data source is integrated into the enterprise data architecture. Additionally, the information resulting from the data assessment is encoded into metadata and stored in a cache. In one embodiment, the cached metadata includes both the data (i.e. "raw data") and the information from the data assessment. The data management system receives a second request for new data that includes data that was assessed while providing the first data requested. The cached data is read and the data necessary to satisfy the second request for data is integrated into the enterprise data architecture according to the information encoded in the cached metadata.

The metadata cache details the information necessary to integrate the data elements of a data source into an enterprise data management system. The metadata is organized into an "envelope" which may include, for example, the data itself, a description of a data schema for the data source, data type information, data extraction logic, data constraints, validation rules, default values, business rules, data interdependencies, data transformation logic, data load instructions, performance data, statistical data, business rules, and/or physical relationships with the enterprise data schema.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
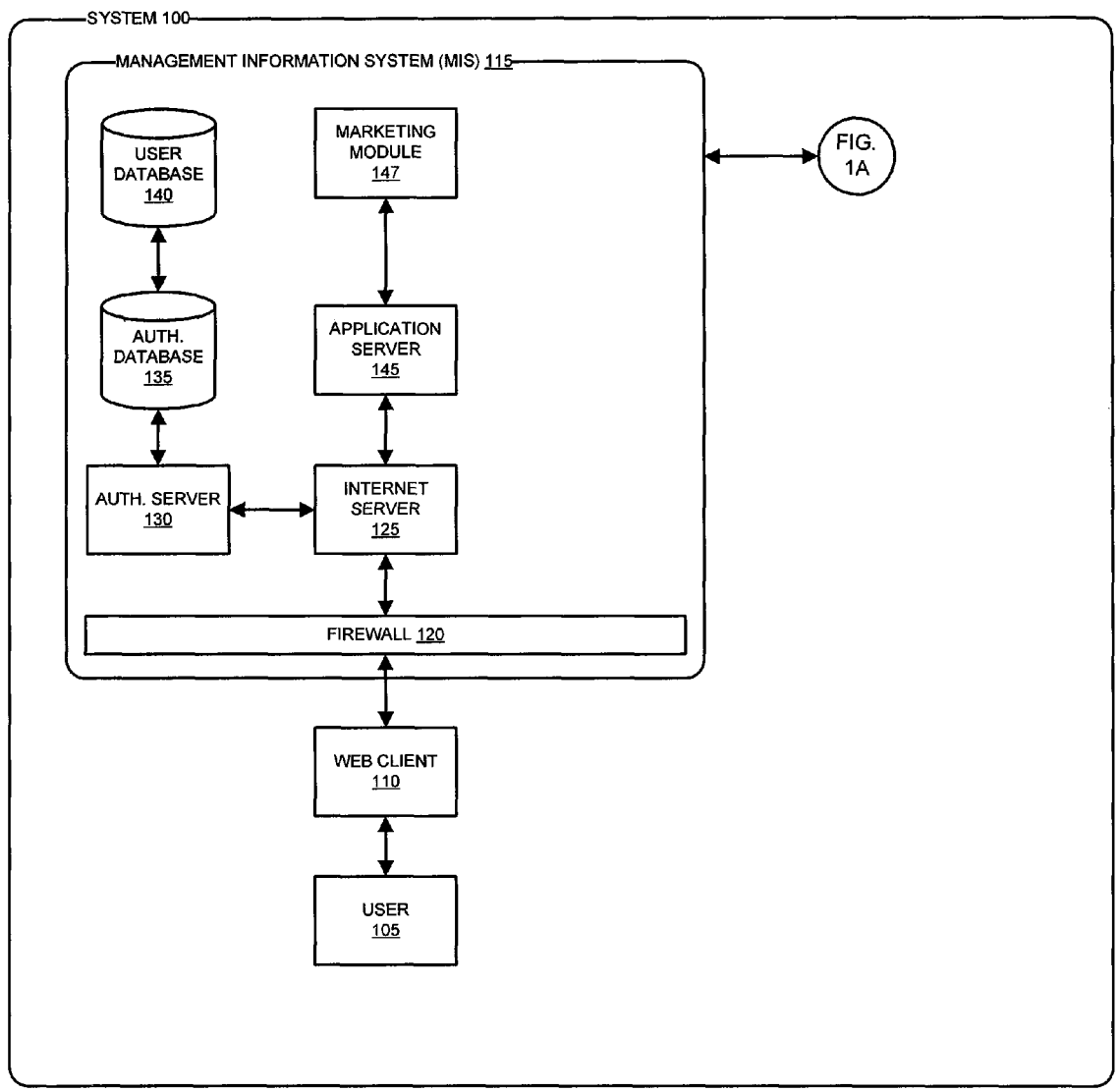
FIG. 1 is an overview of a representative system for providing end users visibility to data elements and access to data.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, system and method includes a rapid caching and data integration facility that reduces the time for data from sources to be integrated into an enterprise's data management system. The system provides a metadata cache that stores comprehensive data element definition and data element integration instructions. While the system may contemplate upgrades or reconfigurations of existing processing systems, changes to existing databases and business information systems' tools are not necessarily required by the present invention. For example, the present system may contemplate, but does not require: a database usage feedback loop or periodic migration of tables from the midrange cached environment to production systems. Moreover, the system may be seamlessly integrated into existing information technology and data management architectures and business information system tools with minimal changes to existing systems.

While described herein in reference to enhancing data quality and timeliness to facilitate the planning and campaign strategy analytics for a marketing organization, practitioners will appreciate that the invention may further be implemented to increase speed, lower cost and enhance the quality associated with integrating new data sources into an enterprise data architecture. For instance, one embodiment may be used in conjunction with existing ETL and business intelligence data processes to accommodate a company's billing operation. Other examples of such data cache and data delivery techniques may be accomplished through a variety of computing resources and hardware infrastructures.

While the description makes reference to specific technologies, system architectures and data management techniques, practitioners will appreciate that this is but one embodiment and that other devices and/or methods may be implemented without departing from the scope of the invention. Similarly, while the description makes frequent reference to a web client, practitioners will appreciate that other examples of data cache and data delivery may be accomplished by using a variety of user interfaces including handheld devices such as personal digital assistants and cellular telephones. Practitioners will also appreciate that a web client is but one embodiment and that other devices and/or methods may be implemented without departing from the scope of the invention.

With reference to FIG. 1, the system includes a user 105 interfacing with a management information system ("MIS") 115 by way of a web client 110. While described in the context data management for a marketing organization, practitioners will appreciate that the present invention may be similarly used in the context of providing data for any function (e.g., business, charity, organization, etc). However, to simplify the explanation, the caching and data delivery functions are often referenced herein the context of integrating data from multiple disparate upstream data sources and providing a system to deliver the data to the user 105 (e.g. a member of a marketing department).

Transmissions between the user 105 and the internet server 125 may pass through a firewall 120 to help ensure the integrity of the MIS 115 components. Practitioners will appreciate that the invention may incorporate any number of security schemes or none at all.

In one embodiment, the Internet server 125 receives page requests from the web client 110 and interacts with various other system 100 components to perform tasks related to requests from the web client 110. Internet server 125 may invoke an authentication server 130 to verify the identity of user 105 and assign specific access rights to user 105. Authentication database 135 may store information used in the authentication process such as, for example, user identifiers, passwords, access privileges, user preferences, user statistics, and the like. When a request to access system 100 is received from Internet server 125, Internet server 125 determines if authentication is required and transmits a prompt to the web client 110. User 105 enters authentication data at the web client 110, which transmits the authentication data to Internet server 125. Internet server 125 passes the authentication data to authentication server which queries the user database 140 for corresponding credentials. When user 105 is authenticated, user 105 may access various applications and their corresponding data sources.

When user 105 logs on to an application, Internet server 125 may invoke an application server 145. Application server 145 invokes logic in the marketing module 147 by passing parameters relating to the user's 105 requests for data. The MIS 115 manages requests for data from the marketing module 147 and acquires the proper data from the enterprise data management system ("EDMS") 150.

Figure 1A:
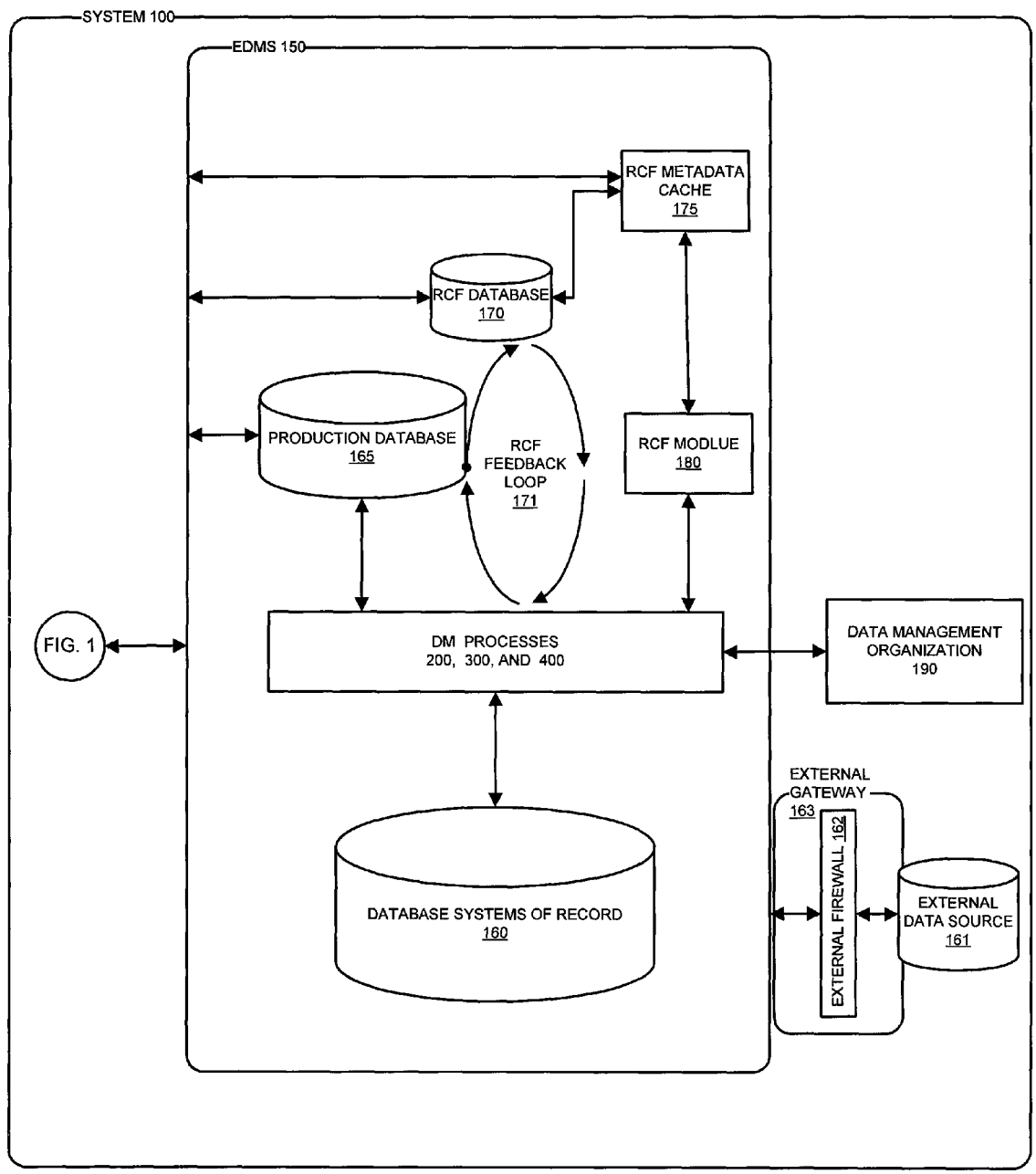
FIG. 1A is an overview of a representative system for integrating new data sources into an enterprise data management system and delivering the data to downstream applications and modules.

With reference to FIG. 1A, EDMS 150 includes elements that manage the enterprise data architecture (including the data contained therein) and elements that deliver data to end users. Production database 165 stores a broad variety of data to meet the needs of an enterprise. As practitioners will appreciate, while depicted as a single entity for the purposes of illustration, production database 165 may represent multiple hardware, software, database, data structure and networking components. In a representative embodiment, the production database 165 is designed to hold stable, persistent information. Thus, organization policy and technical restraints often prohibits or discourages integrating data that, for example, is yet to be validated or otherwise is derived from an untrusted data source. Furthermore, policy often restricts temporary, ad hoc or other such data from being stored in the production database 165. The RCF database 170 provides access to data that is, for example, not suitably stable, reliable or persistent for storage in a production environment.

The database management organization (DMO) 190 is the organization that manages the data needs of an enterprise. DM processes 200, 300 and 400 represent methods and policies employed by the DMO 190 in managing enterprise data. As practitioner's will appreciate and as further illustrated in exemplary processes 200, 300 and 400, DM processes include manual processes, automated processes or any combination of manual and automated steps.

Figure 4:
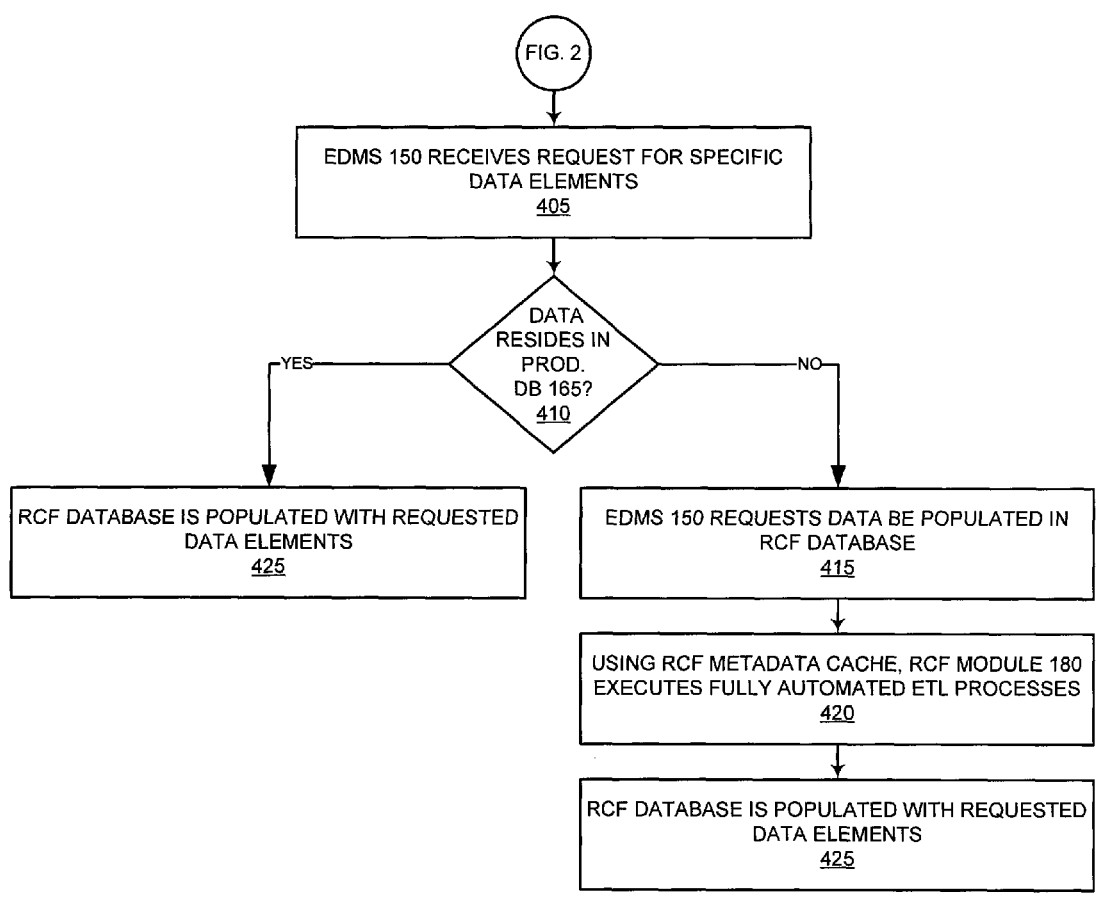
FIG. 4 is a process flow diagram showing a representative process for using cached metadata information to automatically build new database structures and populate them with data.

RCF database 170 is also designed to store data generated by the automated data source integration Process 400 (FIG. 4). The RCF metadata cache 175 stores metadata detailing the elements available in the enterprise data sources including, for example, the production database 165, the RCF database 170, database systems of record 160 and external data sources. As discussed in further detail below, in a representative embodiment, the RCF metadata cache enables both a comprehensive view of all (or a subset of) data elements defined within the enterprise data architecture, as well as database design and administration information useful for automatically integrating new data elements into the RCF database 170. The RCF module 180 is a software module that aids in loading RCF data cache 175 and executes the instructions contained in RCF data. Process RCF feedback loop 171 represents connections between the RCF database 170, DM Processes 200, 300 and 400 and the production database 165 that communicates RCF database 170 performance and usage metrics. RCF feedback loop 171 is useful for such tasks as tuning database performance and analyzing data elements whose usage may indicate need to be migrated to the production database 165.

For instance, in a representative embodiment, planners of a new marketing campaign request access to a data element not currently maintained in the production database 165. However, the data is present in the RCF database 170. If RCF feedback loop 171 reports information indicating frequent usage of this data element or that the query joining the data element in the RCF database 170 with data residing on the production database 165 is resource intensive (e.g. it causes slow performance), then the DMO 190 may decide to perform the systems development lifecycle analysis (Process 300) to optimize database performance (e.g. by building indexes) and/or move data elements to the production database 165. On the other hand, if in a similar example, a data element is loaded to the RCF database 170 for some limited purpose, usage information from RCF feedback loop 171 may indicate that the data should be removed from the RCF database 170 to free up storage resources.

Database systems of record 160 store the enterprise master data such as, for example, transactional, personnel, accounting and asset management data. Practitioner's will appreciate that in one embodiment, the data stored in database systems of record 160 may be duplicated, summarized or otherwise represented in the production database 165. External data source 161 represents any data generated and/or maintained external to the enterprise.

In addition to the components described above, the system 100, the MIS 115 and the EDMS 150 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: the user database 130; account database 150; the RCF database 170; the production database 165; database systems of record 160; and/or like data useful in the operation of system 100.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with marketing management information systems, business intelligence systems, reporting systems, web services, pervasive and individualized solutions, open source, biometrics, mobility and wireless solutions, commodity computing, grid computing and/or mesh computing. For example, in an embodiment, the web client 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. patent application Ser. No. 10/708,822, titled "System For Biometric Security Using A Fob," filed Mar. 26, 2004; and U.S. patent application Ser. No. 10/708,823, titled "Method For Biometric Security Using A Transponder," filed Mar. 26, 2004, which are hereby incorporated by reference.

User 105 may include any individual, business, entity, government organization, software and/or hardware that interact with system 100 to perform tasks such as requesting, retrieving, updating, analyzing, entering or modifying data. User 105 may be, for example, a marketing manager using the system to analyze the benefits of a new marketing strategy or a third-party vendor or partner accessing data to analyze customer data. User 105 may interface with Internet server 125 via any communication protocol, device or method discussed herein, known in the art, or later developed. In one embodiment, user 105 may interact with the MIS 115 via an Internet browser at a web client 110.

Web client 110 comprises any hardware and/or software suitably configured to facilitate requesting, retrieving, updating, analyzing, entering or modifying data such as marketing data or any information discussed herein. Web client 110 includes any device (e.g., personal computer), which communicates (in any manner discussed herein) with the MIS 115 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, minicomputers, PC servers, pervasive computers, network sets of computers, and/or the like. Practitioners will appreciate that the web client 110 may or may not be in direct contact with the MIS 115. For example, the web client 110 may access the services of the MIS 115 through another server, which may have a direct or indirect connection to Internet server 125.

As those skilled in the art will appreciate, the web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, minicomputer, mainframe, mobile device or the like. Web client 110 can be in a home or business environment with access to a network. In an embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 120, as used herein, may comprise any hardware and/or software suitably configured to protect the MIS 115 components from users of other networks. Firewall 120 may reside in varying configurations including stateful inspection, proxy based and packet filtering, among others. Firewall 120 may be integrated as software within Internet server 125, any other system components, or may reside within another computing device or may take the form of a standalone hardware component.

Internet server 125 may include any hardware and/or software suitably configured to facilitate communications between the web client 110 and one or more the MIS 115 components. Further, Internet server 125 may be configured to transmit data to the web client 110 within markup language documents. As used herein, "data" may include encompassing information such as commands, queries, files, data for storage, and/or the like in digital or any other form. Internet server 125 may operate as a single entity in a single geographic location or as separate computing components located together or in separate geographic locations.

Internet server 125 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Application server 145 may include any hardware and/or software suitably configured to serve applications and data to a connected web client 110. Like Internet server 125, the application server 145 may communicate with any number of other servers, databases and/or components through any means known in the art. Further, the application server 145 may serve as a conduit between the web client 110 and the various systems and components of the MIS 115. Internet server 125 may interface with the application server 145 through any means known in the art including a LAN/WAN, for example. Application server 145 may further invoke software modules such as the marketing module 147 in response to user 105 requests.

Marketing module 147 may include any hardware and/or software suitably configured to receive requests from the web client 110 via Internet server 125 and the application server 145. Marketing module 147 is further configured to process requests, construct database queries, and/or execute queries against production databases, external data sources and temporary databases, as well as exchange data with other application modules (not pictured). In one embodiment, the marketing module 147 may be configured to interact with other MIS system 100 components to perform complex calculations, retrieve additional data, format data into reports, create XML representations of data, construct markup language documents, and/or the like. Moreover, the marketing module 147 may reside as a standalone system or may be incorporated with the application server 145 or any other MIS 115 component as program code.

In order to control access to the application server 145 or any other component of the MIS 115, Internet server 125 may invoke an authentication server 130 in response to user 105 submissions of authentication credentials received at Internet server 125. Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the user database 140.

Any databases depicted or implied by FIGS. 1 and 1A (e.g. the user database 140, the RCF database 170, etc.) may include any hardware and/or software suitably configured to facilitate storing identification, authentication credentials, and/or user permissions. One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In an embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of the three data sets in this example may contain different information that is stored using different data storage formats and/or techniques. Further, each data set may contain subsets of data that also may be distinct from other subsets.

As stated above, in various embodiments of system 100, the data can be stored without regard to a common format. However, in one embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The EDMS 150 may be interconnected to an external data source 161 (for example, to obtain data from a vendor) via a second network, referred to as the external gateway 163. The external gateway 163 may include any hardware and/or software suitably configured to facilitate communications and/or process transactions between the EDMS 150 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing either inside EDMS 150, the external data source 161 or any other known configuration. External gateway 163 may be configured to process transactions between the RCF module 180 and other systems and components within EDMS 150 and/or systems and components residing in the MIS 115. In one embodiment, the external gateway 163 may comprise web services that are invoked to exchange data between the various disclosed systems. The external gateway 163 represents existing proprietary networks that presently accommodate data exchange for data such as financial transactions, customer demographics, billing transactions and the like. The external gateway 163 is a closed network that is assumed to be secure from eavesdroppers.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagrams and process flow diagrams represent mere embodiments of the invention and are not intended to limit the scope of the invention as described herein. For example, the steps recited in FIGS. 2-4 may be executed in any order and are not limited to the order presented. It will be appreciated that the following description makes appropriate references not only to the steps depicted in FIGS. 2-4, but also to the various system components as described above with reference to FIGS. 1 and 1A.

Figure 2:
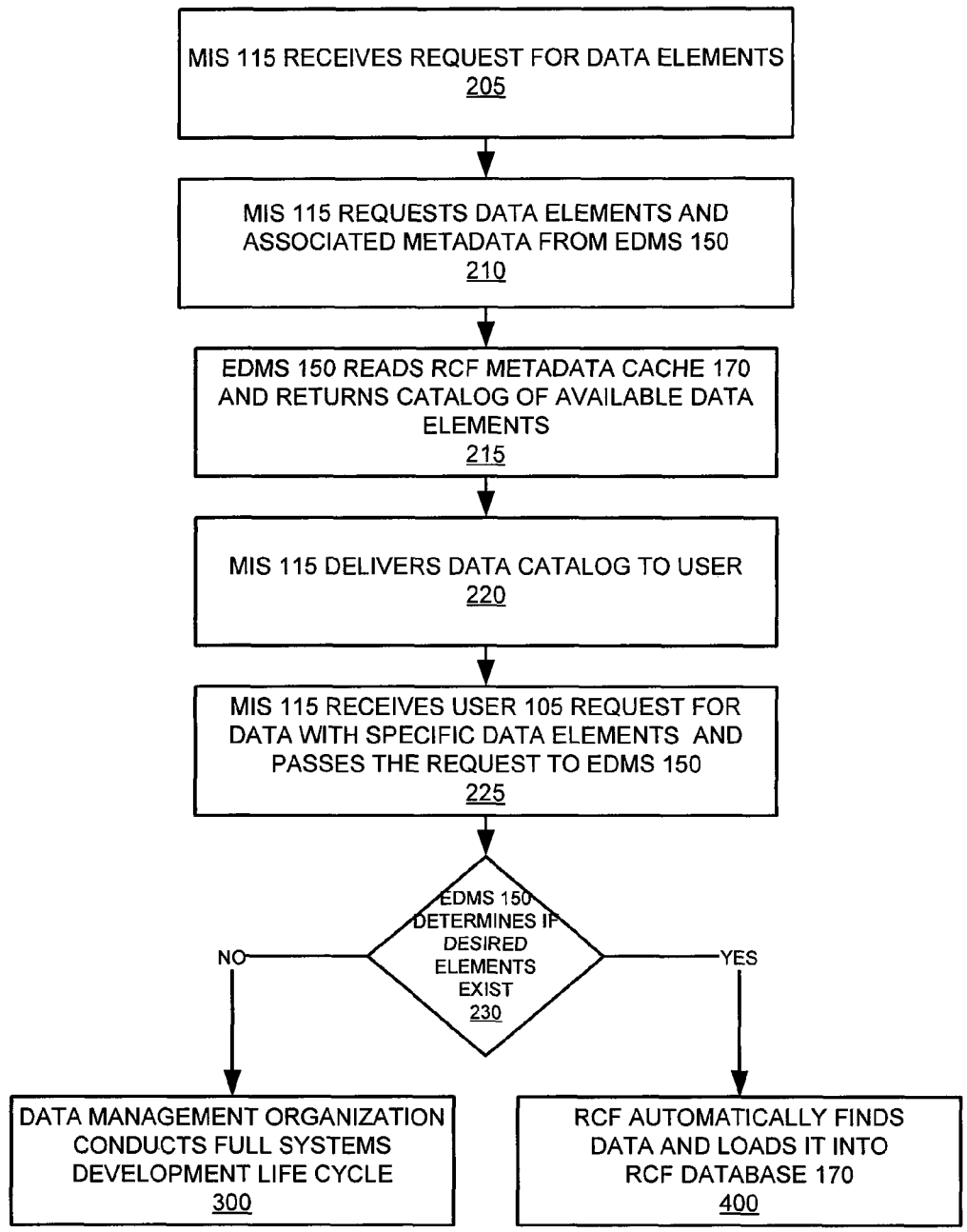
FIG. 2 is a process flow diagram showing a representative process for responding to user requests for new data elements.

With reference to FIG. 2, a representative data management process for providing data to end users includes the marketing module 147 receiving a request from user 105 to review the data elements that are maintained in the EDMS 150 (Step 205). Marketing module 147 passes the request to the EDMS 150 (Step 210). The EDMS 150 reads the metadata cache 175 and returns a catalog of available data elements (Step 215). In one embodiment, a separate data element catalog and/or data dictionary module provides a rich set of functionality for searching, viewing and requesting data elements. This functionality can be built into existing management information systems or can be seamlessly integrated using a number of commercially available off-the-shelf software products. Thus, practitioners will appreciate that variations among the various elements of this process will likely exist.

Figure 3:
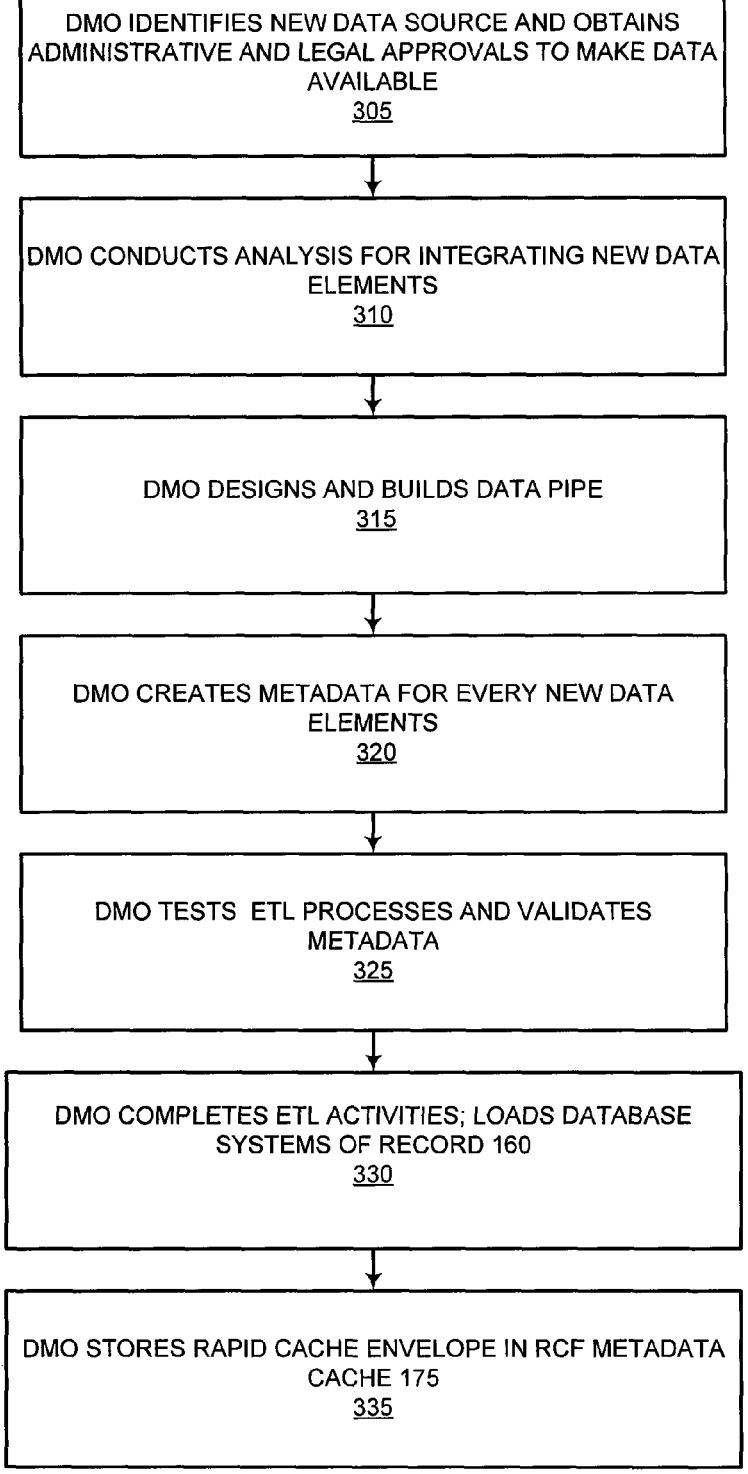
FIG. 3 is a process flow diagram showing a representative process for generating metadata that enables automated integration of new data elements.

Marketing module 147 receives a request from user 105 for access to a database table containing specific data elements (Step 220) and passes the request to the EDMS 150 (Step 225). The RCF module 180 determines whether the elements requested by user 105 are available by examining the RCF metadata cache 175 (Step 230). If some of the data elements are not available, then the DMO 190 conducts a full systems development life cycle (Step 300) to identify a proper data source that contains the requested data, and integrates the data source into EDMS 150. Referring now to FIG. 3, the DMO 190 identifies a source of the requested data (Step 305). In one embodiment, the origin of new data elements include: a new external data source, for example customer demographic data obtained from a vendor; an internal data source, a new data entry system that captures data that had previously not been captured; and/or data derived from data already residing in EDMS 150 by, for example, summarizing information or performing calculations. The DMO obtains policy and/or legal approval to access the new data elements (Step 305) and designs and builds the data structure to access the new data sources, i.e. a "data pipe" is built.

The DMO performs analysis to integrate the data elements into EDMS 150 (Step 310). This analysis is conducted similarly to existing systems' life cycle methods and many of the tasks accomplished may be similar to ETL techniques known in the art. For detailed information on ETL methods see "The Data Warehouse ETL Toolkit" by Ralph Kimball, published by Wiley in 2004 (ISBN 0-7645-6757-8), which is hereby incorporated by reference. One challenge faced by the DMO 190 when integrating a new data source into the EDMS 150 is that each separate source may use a different data organization and format. For example, data source formats commonly integrated by the DMO 190 include relational databases, flat files, non-relational database structures, or other data structures such as VSAM or ISAM. ETL tools are often custom built by the DMO 190 but a large number of off-the-shelf software products that provide ETL functionality are also commercially available.

The DMO plans (Step 310), designs (Step 315) and tests (Step 325) ETL functions for a new data source. Execution of the ETL activities occurs in Step 330. Extraction converts the data into a format for transformation processing and involves high level validation processes that, for instance, verify format or reject incomplete data records. In one embodiment, the transform stage applies rules or functions to the extracted data and places the data in a form for loading into the target system such as the production database 165 depicted in FIG. 1A. Transformation operations are designed to derive data that is valid and relevant to the business and technical needs of the enterprise. Typical transformation methods include filtering data; translating coded values; deriving new data using, for example, concatenation or calculation; joining together data from multiple sources; and/or applying complex data validation. The load phase takes the transformed data and loads it into a database or other data structure. As the load phase interacts with the production database 165, the constraints defined in the database schema, as well as in triggers activated upon data load, apply (e.g. uniqueness, referential integrity, mandatory fields, etc.).

In addition to typical ETL processes, the DMO 190 also builds the RCF metadata cache during process 300. The DMO 190 produces metadata that details the information to integrate the data elements of a data source into EDMS system 150 (320). This metadata is organized into an "envelope" loaded to the RCF metadata cache facility 175 (Step 335). The metadata envelope includes, for example, data elements, business rules, data interdependencies, validation rules, transformation logic, error logs, statistical data, functional relationships (e.g. business rules) with other EDMS 190 data elements, physical relationships with other EDMS 190 data elements, and the like. In one embodiment, the metadata envelope is encoded using XML and XSL scripts. However, other metadata definition language and data transformation scripting languages can be similarly implemented.

The new data source (i.e. the source identified in Step 305) often contains data elements not presently used by the enterprise. However, the end-to-end process of integrating a new data source (Process 300) is long, expensive and resource intensive. In order to meet the needs of an enterprise (for example, the need to bring a new marketing campaign to the market in an expedited timeframe), many organizations require access to new data elements faster than is typically feasible for many DMO's.

To address this issue, the DMO 190 conducts analysis on every data element of a new data source regardless of whether that data element is part of a current data requirement (Step 320). This process provides valuable functionality to the enterprise. The complete set of data elements available to an enterprise maintained in the RCF metadata cache 175 provides the organization with a comprehensive view of data available regardless of whether the data has been fully integrated into the EDMS 190. Furthermore, the RCF metadata cache 175 is preloaded with the intelligence to fully integrate the new data elements, often with minimal or no additional analysis or manual processes (Process 400). Thus, once the steps in Process 300 are completed for a data source, the analysis may not be repeated for future requests for data elements from that same source.

Returning now to FIG. 2, if the data elements requested by the user 105 (Step 220) are available, the RCF module 180 automatically finds the data and makes it available to the MIS 115 (Process 400). In one embodiment, EDMS 150 transmits a notification of the data integration. In one embodiment, the RCF module 180 reads the RCF metadata cache 175 to determine if the data elements requested are stored in the production database 165 and whether the data exists in a format that satisfies the user request (Step 410). If the optimal data resides in the production database 165, EDMS 150 retrieves the data and returns it to the user 105 (Step 415). If the data elements requested are either not present in the production database 165, or do not exist in a format that satisfies the user request, the RCF module 180 accesses the suitable automated scripts and parameters from the RCF metadata cache 175 (Step 420).

As part of the systems development lifecycle initially conducted by the DMO 190 in Process 300 (FIG. 3) for each new data source, the RCF metadata cache 175 contains the information useful to automate the knowledge and capabilities of database administrator personnel executing manual database administration tasks. The RCF module 180 executes the proper scripts to perform database administration tasks to provide the requested data in a valid and useful form; such tasks include, for example, creating table structures, indexes and constraints in the RCF database 170, extracting data from the database systems of record 160 and/or transforming the data to the desired form. In one embodiment, transformation activities include combining data (for example through the use of lookups and table joins) with other data residing in the EDMS system 150. Using automated scripts and other information stored in the RCF metadata cache 175 and the RCF module 180, the transformed data is loaded into the data structures in RCF database 175 which were created by Step 420.

The enterprise data management systems and processes, and in particular the rapid caching facility systems and methods, described herein provide numerous advantages to an enterprise. Data is delivered rapidly to the end user. This innovative approach significantly reduces both end-to-end cycle time and the operational expense for integrating new data elements into an enterprise data architecture. Cost savings include operational costs for data processing, data storage and data management resources. Furthermore, enhanced automation and elimination of steps in the data integration process reduce personnel costs. From the operational organization's perspective, the opportunity cost savings associated with having access to quality data in a timely fashion enabled by the invention is also valuable; i.e. the shortcomings of existing solutions cost organizations immeasurably in the form of lost opportunity resulting from untimely and/or poor quality data.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A computer-based method for data integration comprising:
   receiving, by a data integration computer, a first request for a first subset comprising a first data element subset and a first raw data subset derived from data, wherein said data includes at least one of raw data and data elements relating to said raw data, and wherein said data includes said first raw data subset and said first data element subset;
   receiving, by said computer, said data from a data source;
   assessing, by said computer, said data for integration into an enterprise data architecture;
   integrating, by said computer, said first subset into said enterprise data architecture based upon said assessing;
   creating, by said computer, metadata related to said data and based upon said assessing, wherein said metadata comprises data element definitions associated with said data elements and at least one of data extraction logic and data transformation logic;
   caching, by said computer, said data and said metadata to create cached data and cached metadata;
   receiving, by said computer, a second request for a second subset comprising a second data element subset and a second raw data subset derived from said data;
   analyzing, by said computer and based upon said second data element subset, said enterprise data architecture and said cached metadata to determine a third data element subset comprising data elements present in said cached data but not present in said enterprise data architecture;
   integrating, by said computer, said third data element subset into said enterprise data architecture;
   analyzing, by said computer and based upon said second raw data, said enterprise data architecture and said cached data to determine third raw data, said third raw data being present in said cached data but not present in said enterprise data architecture;
   extracting, by said computer and based upon said data extraction logic, said third raw data; and
   integrating, by said computer, said third raw data into said enterprise data architecture.

2. The method of claim 1, wherein said second subset includes a portion of said first subset.

3. The method of claim 1, further comprising transmitting a notification of said step of integrating at least one of said first subset and said second subset.

4. The method of claim 1, wherein creating metadata further comprises creating data transformation scripts and data loading scripts comprising instructions for integrating said data into said enterprise data architecture.

5. The method of claim 1, further comprising packaging said metadata into an envelope.

6. The method of claim 1, further comprising packaging said metadata into an envelope and storing said envelope in a metadata cache.

7. The method of claim 1, further comprising packaging said metadata into an envelope, wherein said metadata comprises at least one of: said data source, description of a data schema for said data source, data type information, data extraction logic, a data constraint, a validation rule, a default value, a business rule, a data interdependency, data transformation logic, a data load instruction, performance data, statistical data, a business rule, and a physical relationship with said enterprise data schema.

8. The method of claim 1, wherein said second request includes data elements not included in said first request.

9. The method of claim 1, wherein said integrating at least one of: said first subset and said second subset further comprises creating a database.

10. The method of claim 1, wherein said integrating at least one of: said first subset and said second subset further comprises creating a database and monitoring said database.

11. The method of claim 1, wherein said integrating at least one of: said first subset and said second subset further comprises creating a database, monitoring said database to obtain database performance tuning information, and tuning said database based upon said database performance tuning information.

12. The method of claim 1, further comprising transmitting said cached metadata.

13. A non-transitory machine-readable medium having stored thereon a plurality of instructions integrating data, said plurality of instructions when executed by at least one data integration processor, cause said processor to perform operations comprising:
- receiving, by said processor, a first request for a first subset comprising a first data element subset and a first raw data subset derived from data, wherein said data includes at least one of raw data and data elements relating to said raw data, and wherein said data includes said first raw data subset and said first data element subset;
- receiving, by said processor, said data from a data source;
- assessing, by said processor, said data for integration into an enterprise data architecture;
- integrating, by said processor, said first subset into said enterprise data architecture based upon said assessing;
- creating, by said processor, metadata related to said data and based upon said assessing, wherein said metadata comprises data element definitions associated with said data elements and at least one of data extraction logic and data transformation logic;
- caching, by said processor, said data and said metadata to create cached data and cached metadata;
- receiving, by said processor, a second request for a second subset comprising a second data element subset and a second raw data subset derived from said data;
- analyzing, by said processor and based upon said second data element subset, said enterprise data architecture and said cached metadata to determine a third data element subset comprising data elements present in said cached data but not present in said enterprise data architecture;
- integrating, by said processor, said third data element subset into said enterprise data architecture;
- analyzing, by said processor and based upon said second raw data, said enterprise data architecture and said cached data to determine third raw data, said third raw data being present in said cached data but not present in said enterprise data architecture;
- extracting, by said processor and based upon said data extraction logic, said third raw data; and,
- integrating, by said processor, said third raw data into said enterprise data architecture.

14. A system, comprising:
a network interface communicating with a non-transitory memory;
said memory communicating with a data integration processor; and
said processor, when executing a data integration computer program, performs operations comprising:
- receiving, by said processor, a first request for a first subset comprising a first data element subset and a first raw data subset derived from data, wherein said data includes at least one of raw data and data elements relating to said raw data, and wherein said data includes said first raw data subset and said first data element subset;
- receiving, by said processor, said data from a data source;
- assessing, by said processor, said data for integration into an enterprise data architecture;
- integrating, by said processor, said first subset into said enterprise data architecture based upon said assessing;
- creating, by said processor, metadata related to said data and based upon said assessing, wherein said metadata comprises data element definitions associated with said data elements and at least one of data extraction logic and data transformation logic;
- caching, by said processor, said data and said metadata to create cached data and cached metadata;
- receiving, by said processor, a second request for a second subset comprising a second data element subset and a second raw data subset derived from said data;
- analyzing, by said processor and based upon said second data element subset, said enterprise data architecture and said cached metadata to determine a third data element subset comprising data elements present in said cached data but not present in said enterprise data architecture;
- integrating, by said processor, said third data element subset into said enterprise data architecture;
- analyzing, by said processor and based upon said second raw data, said enterprise data architecture and said cached data to determine third raw data, said third raw data being present in said cached data but not present in said enterprise data architecture;
- extracting, by said processor and based upon said data extraction logic, said third raw data; and,
- integrating, by said processor, said third raw data into said enterprise data architecture.

* * * * *